Figure 1:
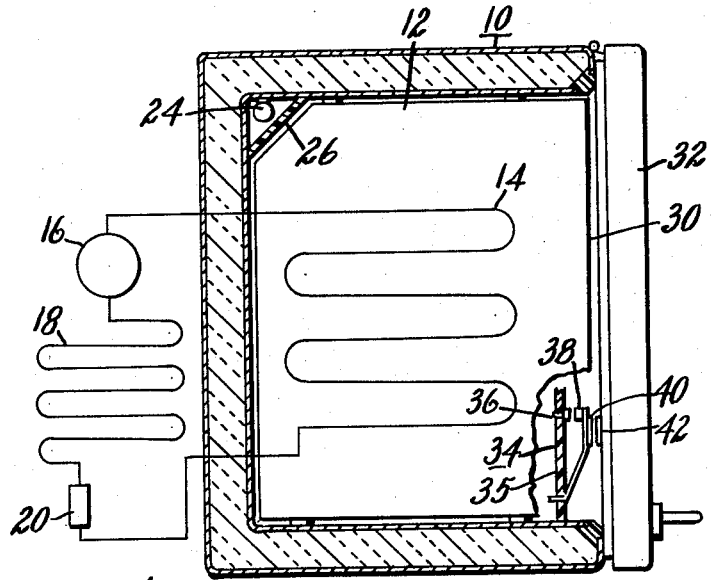

Sept. 27, 1960  V. G. SHARPE  2,953,909
REFRIGERATOR CABINET ILLUMINATING MEANS
Filed Nov. 17, 1958

INVENTOR.
VERLOS G. SHARPE
BY Edwin S. Wybrig
HIS ATTORNEY

United States Patent Office 2,953,909
Patented Sept. 27, 1960

2,953,909

REFRIGERATOR CABINET ILLUMINATING MEANS

Verlos G. Sharpe, Xenia, Ohio, assignor to General Motors Corporation, Detroit, Mich., a corporation of Delaware Filed Nov. 17, 1958, Ser. No. 774,216

5 Claims. (Cl. 62—264)

This invention relates to refrigerating apparatus and more particularly to an arrangement which makes it possible to utilize a fluorescent light mounted directly in the refrigerated space for illuminating the food storage compartment when the door of the refrigerator is opened.

The problem which this invention is designed to solve is one which is peculiar to the use of fluorescent lights in household refrigerators. The desirability of utilizing a fluorescent light for illuminating the interior of a refrigerator has long been recognized but the prior art type of low cost, low voltage fluorescent lights and controls therefor do not respond quickly enough after opening the refrigerator door when the light bulbs or tubes are in the refrigerated space and therefore conventional fluorescent lights controlled in the conventional manner have not proven satisfactory. It is also an object of this invention to prolong the life of the various components of the lighting system by eliminating the need for starting the lamp with each door opening.

It is an object of this invention to provide an improved control switch and circuit arrangement whereby a low cost fluorescent light will light up instantaneously upon opening the refrigerator door even though the light bulb itself is mounted in a refrigerated space.

It is another object of this invention to provide an improved control arrangement whereby the cathodes of a fluorescent light are energized continuously and the conducting gas in the tube remains ionized continuously.

Still another object of this invention is to provide an improved fluorescent light arrangement which prevents objectionable condensation of moisture on the external walls of the tube in a household refrigerator.

Further objects and advantages of the present invention will be apparent from the following description, reference being had to the accompanying drawings, wherein a preferred form of the present invention is clearly shown.

Figure 2:
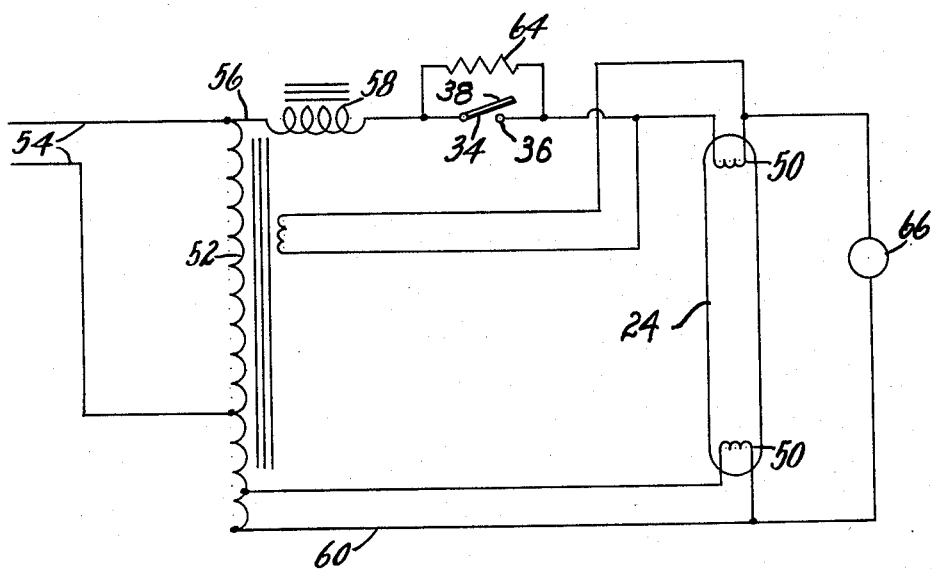

In the drawings:

Figure 1 is a horizontal sectional view partly diagrammatic showing the invention applied to a household refrigerator; and Figure 2 is a schematic wiring diagram showing the electric circuit and controls for the fluorescent light.

Referring now to the drawings wherein a preferred embodiment of the invention has been shown, reference numeral 10 generally designates a household refrigerator having a refrigerated food storage compartment 12 provided with an access door 32. The compartment 12 is refrigerated by means of a refrigerating system which comprises an evaporator 14 having its outlet connected to a compressor 16 which in turn has its outlet connected to a condenser 18. The refrigerant liquefied in the condenser 18 is returned to the evaporator 14 through a conventional pressure regulator device 20. The refrigerating system just described is intended to represent a conventional system for cooling the food compartment 12.

Light for the food storage compartment 12 is provided by a conventional fluorescent lamp 24 which is preferably mounted in one corner of the refrigerator directly behind a transparent plastic shield 26 which protects the lamp 24 from being damaged by objects which may be placed on the food shelf 30. It will be noted that the one corner of the shelf 30 has been cut away so as to provide room for the lamp and plastic shield 26. The lamp 24 is preferably turned on and off in response to opening and closing of the main refrigerator door 32 and in order to accomplish this a door operated switch 34 is provided as shown which is adapted to control the operation of the lamp 24 in response to opening and closing movement of the door. The switch has been shown somewhat schematically in Figure 1 of the drawing and preferably includes an insulating contact support 35 on which there is mounted a stationary contact 36 and a complementary movable contact 38. The contact 38 is in the form of a spring arm which has a magnetic bar or armature 40 supported thereon at a point directly opposite a permanent magnet 42 secured to the inside surface of the refrigerator door 32. The spring contact 38 is biased into engagement with the stationary contact 36 at all times but is held out of engagement with the contact 36 whenever the door 32 is closed by virtue of the bar 40 being attracted towards the magnet 42 carried by the door whenever the door is in the closed position. If desired, the member 40 could be a permanent magnet and the member 42 an armature or both members could be magnets having their poles arranged so that they attract one another.

By providing the circuit arrangement shown in Figure 2 of the drawing, it is now possible to utilize a fluorescent lamp for illuminating the interior of a refrigerator and to have the lamp light up instantaneously upon opening the refrigerator door even though the lamp is disposed directly within the refrigerated food compartment and even though the line voltage supplied to the electrical parts on the refrigerator may be considerably below the standard 110 or 115 volt rating. As shown in Figure 2 of the drawing the cathodes 50 of the lamp are adapted to be heated continuously with the result that the lamp will be ready to provide maximum illumination the instant the door of the refrigerator is opened.

The control circuit includes a conventional autotransformer 52 which is adapted to be connected in parallel with the main compressor motor across the standard 115 volt 60 cycle alternating current power supply lines 54. The transformer 52 supplies 150 volts to the lamp circuit. A power line 56 which is connected to the one side of the auto-transformer as shown, has connected therein a conventional choke coil 58 which is arranged in series with the door switch 34 and serves its usual function of restricting the flow of current to the lamp as the lamp resistance decreases. A second line 60 is connected to the door side of the auto-transformer 52 so that the voltage across the lines 56 and 60 will be approximately 150 volts when the voltage across the lines 54 is at its rated 115 volt value.

Since it is not necessary or desirable to provide full illumination in the refrigerator when the door is closed, but it is desirable to provide for continuous ionization of the gas in the lamp at all times, there is provided a resistance element 64 in shunt with the switch 34 at all times. The resistance 64 is of such a value that it materially restricts the flow of current to the lamp when the door is closed and when no light is required but allows sufficient flow of current to maintain the gas in the lamp at least partially ionized at all times. A conventional starter 66 is provided as shown but is only called upon to function when the lamp is first energized or after a power failure. This prolongs the life of the starter as it is not required to operate each time the door is opened. Since the cathodes remain heated and the gas in the lamp is ionized at all times, the life of the lamp is also prolonged to the extent that the lamp may never need replacement during the life of the refrigerator.

While the form of embodiment of the invention as herein disclosed constitutes a preferred form, it is to be understood that other forms might be adopted, as may come within the scope of the claims which follow.

What is claimed is as follows:

1. In a refrigerator, an insulated cabinet having a food storage compartment therein, an access door for said compartment, an evaporator arranged to cool the interior of said compartment, refrigerant liquefying means for supplying liquid refrigerant to said evaporator, a fluorescent lamp disposed in said compartment, said lamp comprising a tube having a pair of cathodes located in spaced relationship to one another within said tube, means for continuously heating said cathodes, means for continuously applying a voltage across said cathodes, and means including a switch operated by said door for varying the flow of current through said lamp.

2. In combination, a refrigerator cabinet having a refrigerated food storage compartment therein, a fluorescent lamp disposed in said refrigerated food storage compartment so as to be refrigerated thereby, said lamp having a pair of spaced cathodes, means for continuously heating said cathodes, and means for continuously applying a voltage across said cathodes so as to maintain the gas within said lamp at least partially ionized at all times, said last named means including means for varying the flow of current through said lamp so as to vary the light intensity of said lamp.

3. In combination, a refrigerator cabinet having a food storage compartment therein, an access door for said compartment, a fluorescent lamp disposed in said food storage compartment, said lamp having a pair of spaced cathodes, means for continuously heating said cathodes, and means for continuously applying a voltage across said cathodes so as to maintain the gas within said lamp at least partially ionized at all times, said last named means including means for varying the flow of current through said lamp so as to vary the light intensity of said lamp, said current flow varying means comprising a resistance in series with said lamp and a door operated switch means for shunting said resistance whenever said door is opened.

4. In combination, a refrigerator cabinet having a food storage compartment therein, an access door for said compartment, a fluorescent lamp disposed in said food storage compartment, said lamp including an elongated tube containing an ionizable gas therein and having a pair of cathodes located at opposite ends thereof, means for continuously heating said cathodes, means for continuously applying a voltage across said cathodes so as to maintain said gas at least partially ionized at all times, and means for varying the flow of current through said lamp so as to vary the light intensity of said lamp.

5. In combination, a refrigerator cabinet having a food storage compartment therein, an access door for said compartment, a fluorescent lamp disposed in said food storage compartment, said lamp including an elongated tube having a pair of cathodes located at opposite ends thereof, means for continuously heating said cathodes, means for continuously applying a voltage across said cathodes and means for varying the flow of current through said lamp so as to vary the light intensity of said lamp, said last named means comprising a switch having a first contact, a second contact movable into and out of engagement with said first contact, a magnet carried by said second contact, an armature carried by said door and arranged to cooperate with said magnet for holding said second contact out of engagement with said first contact when said door is in the closed position.

References Cited in the file of this patent

UNITED STATES PATENTS

| | | |
|---|---|---|
| 1,764,784 | Freeman | June 17, 1930 |
| 2,339,085 | Luckiesh | Jan. 11, 1944 |
| 2,394,966 | Floyd | Feb. 12, 1946 |
| 2,462,336 | Ruff | Feb. 22, 1949 |
| 2,717,332 | Hamilton | Sept. 6, 1955 |